Patented Feb. 11, 1941

2,231,611

UNITED STATES PATENT OFFICE 2,231,611

HALOGENATED PHENANTHROLINES

Jacob Böeseken, Delft, and Ulbe Gerrit Bijlsma, Utrecht, Netherlands

No Drawing. Application October 18, 1935, Serial No. 45,686. Renewed April 8, 1940. In the Netherlands December 22, 1934

3 Claims. (Cl. 260—283)

Our present invention relates to a process of preparing halogenated meta-phenanthrolines, i. e. phenanthrolines containing a substituent halogen atom in the 5 position. In this way compounds are obtained which are of importance as starting materials for preparing therapeutically active substances.

In my copending application Serial Number 45,687 filed October 18, 1935, i. e., on the same day as this application, it is explained that certain amino derivatives of meta phenanthroline have an anodyne effect, that is to say, they allay or overcome pain. The halogenated meta phenanthrolines described in this application are useful in preparing the said amino phenanthrolines described in the said copending application.

According to one feature of our present invention halogen substituted phenylenediamines, or halogen substituted quinolines are subjected to a Skraup synthesis. The amino compounds may be wholly or partly acylated; thus mono- or dialkoyl or aroyl derivatives may be employed. Alternatively corresponding azo compounds may be used. According to a further feature of the invention non-substituted phenanthrolines are directly halogenated.

In order to elucidate the invention the following examples are given:

*Example 1.*—Preparation of 5-chloro-m-phenanthroline. Formula:

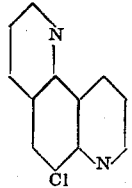

100 grams of 4-chloro-m-phenylenediamine, 225 cc. of glycerine, 150 grams of arsenic pentoxide, and 125 cc. of sulphuric acid of spec. gravity 1.84, are boiled under a reflux condenser for six hours in an oilbath of 140 to 170° C.

The product is poured out on ice and water, filtered and the filtrate is made alkaline by means of ammonia.

The precipitated, syrupy liquid is separated from the aqueous liquid and is dissolved in alcohol. After drying the alcoholic solution by means of potash, which facilitates the subsequent distillation, the alcohol is driven off by distillation. The residue is fractionated by distillation under strongly reduced pressure.

At high vacuum and a bath-temperature of about 150° C. the 5-chloro-m-phenanthroline readily distills. By recrystallization, e. g. from alcohol, the white 5-chloro-m-phenanthroline is obtained in a pure state; melting point 121° C.

*Example 2.*—Preparation of 5-bromo-m-phenanthroline. Formula:

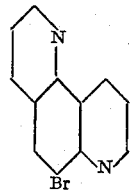

250 grams of 4-bromo-m-phenylenediamine or 400 grams of 4-bromo-diacetyl-m-phenylenediamine, 380 grams of arsenic-pentoxide, 600 cu. cms. of glycerine, 330 cc. of sulphuric acid spec. gravity 1.84 and, if desired, 50 cc. of water are boiled under a reflux condenser for 6 hours in an oil bath at 140–160° C. Following the same steps as those described in Example 1 white 5-bromo-m-phenanthroline is obtained; melting point 110° C.

For preparing 4-bromo-diacetyl-m-phenylenediamine of the formula:

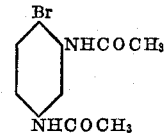

one proceeds e. g. as follows:

400 grams of diacetyl-m-phenylenediamine are dissolved in 5 litres of glacial acetic acid. At room temperature 330 grams of bromine are added. After pouring out into water the bromine substituted compound is obtained in a fairly pure state.

*Example 3.*—Preparation of 5-bromo-m-phenanthroline.

100 grams of 5-amino-8-bromo-quinoline, 60 grams of arsenic pentoxide, 90 cc. of glycerine, 50 cc. of sulphuric acid specific gravity 1.84 and, if desired, a small quantity of water are boiled under a reflux condenser in an oil bath of 140–160° C.

Following the same steps as those described in Example 1 white 5-bromo-m-phenanthroline is obtained, melting point 110° C.

In the above examples the amino compounds may be replaced by corresponding azo-compounds, e. g. instead of 5-amino-8-bromo-quinoline the equivalent quantity of 5-benzazo-8-bromo-quinoline may be subjected to the Skraup synthesis.

We claim:

1. As a new product, 5 halo meta phenanthroline.

2. As a new product, 5 chloro meta phenanthroline.

3. As a new product, 5 bromo meta phenanthroline.

JACOB BOESEKEN,
ULBE GERRIT BIJLSMA.